(12) United States Patent
Sainz De La Maza Escobal et al.

(10) Patent No.: US 7,473,847 B2
(45) Date of Patent: Jan. 6, 2009

(54) COUPLING SYSTEM BETWEEN HIGH-VOLTAGE ELECTRICAL EQUIPMENT

(75) Inventors: Norberto Sainz De La Maza Escobal, Vizcaya (ES); Carlos Coca Figuerola, Vizcaya (ES)

(73) Assignee: Ormazabal y Cia S.A. (ES)

( * ) Notice: Subject to any disclaimer, the term of this patent is extended or adjusted under 35 U.S.C. 154(b) by 0 days.

(21) Appl. No.: 10/565,041

(22) PCT Filed: Jun. 7, 2004

(86) PCT No.: PCT/ES2004/000260

§ 371 (c)(1),
(2), (4) Date: Jan. 18, 2006

(87) PCT Pub. No.: WO2005/008854

PCT Pub. Date: Jan. 27, 2005

(65) Prior Publication Data

US 2007/0010105 A1    Jan. 11, 2007

(30) Foreign Application Priority Data

Jul. 18, 2003    (ES) ............................... 200301699

(51) Int. Cl.
*H02G 15/02*    (2006.01)
(52) U.S. Cl. .................. 174/74 R; 174/77 R; 174/78; 174/84 R
(58) Field of Classification Search ............. 174/74 R, 174/75 R, 78, 80, 84 R, 88 R, 94 R, 94 S
See application file for complete search history.

(56) References Cited

U.S. PATENT DOCUMENTS 4,815,986 A * 3/1989 Dholoo ...................... 439/248
6,129,554 A * 10/2000 Poth .............................. 439/8
7,077,697 B2 * 7/2006 Kooiman ..................... 439/557
2001/0006856 A1   7/2001 Starck ......................... 439/278

FOREIGN PATENT DOCUMENTS

| DE | 43 12 261 A1 |   | 10/1994 |
|---|---|---|---|
| DE | 44 35 864 A1 | * | 4/1996 |
| DE | 101 19 183 C1 |   | 8/2002 |
| DE | 102 46 557 A1 |   | 4/2004 |
| EP | 0 199 208 |   | 10/1986 |
| EP | 0 520 933 A1 |   | 12/1992 |

(Continued)

OTHER PUBLICATIONS

International Search Report PCT/ES2004/000260 Dated Jul. 19, 2004.

*Primary Examiner*—William H Mayo, III
(74) *Attorney, Agent, or Firm*—Ostrolenk, Faber, Gerb & Soffen, LLP

(57) ABSTRACT

The coupling system is of the type composed of a connector (1) which includes an insulating envelope (2), inside which are housed some conducting elements, which incorporates a semi-conducting layer 3) on the external surface of the envelope (2). This system incorporates a protection device (6) placed around the semi-conducting layer (3). The protection device (6) can, optionally, consist of a conducting ring connected to earth that the arc length in case of a dielectric failure of the coupling system. The protection device may incorporate an inductive current gauge and/or a capacitive voltage gauge that allow obtaining various electrical magnitudes of the high-voltage equipment.

13 Claims, 4 Drawing Sheets

FOREIGN PATENT DOCUMENTS

| | | |
|---|---|---|
| EP | 0 645 782 A1 | 3/1995 |
| EP | 0 891 013 A1 | 1/1999 |
| EP | 1 294 064 A2 | 3/2003 |
| EP | 1 339 145 A1 | 8/2003 |
| WO | WO 02/35668 A1 | 5/2002 |
| WO | WO 02/087042 A1 | 10/2002 |

\* cited by examiner

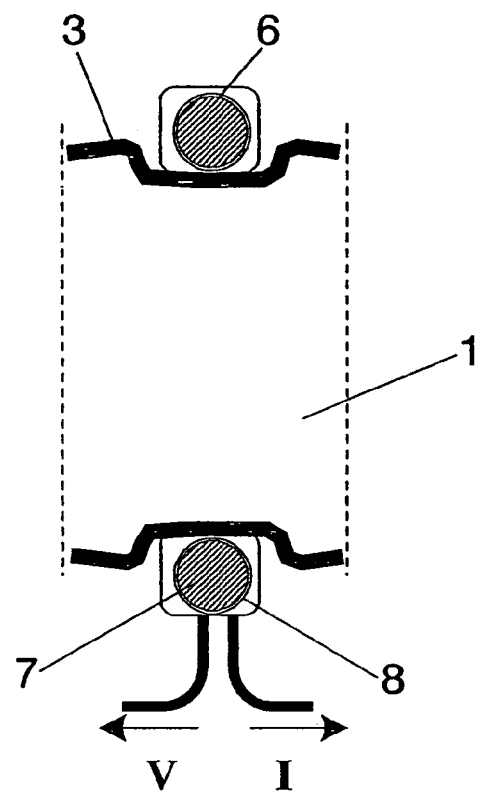
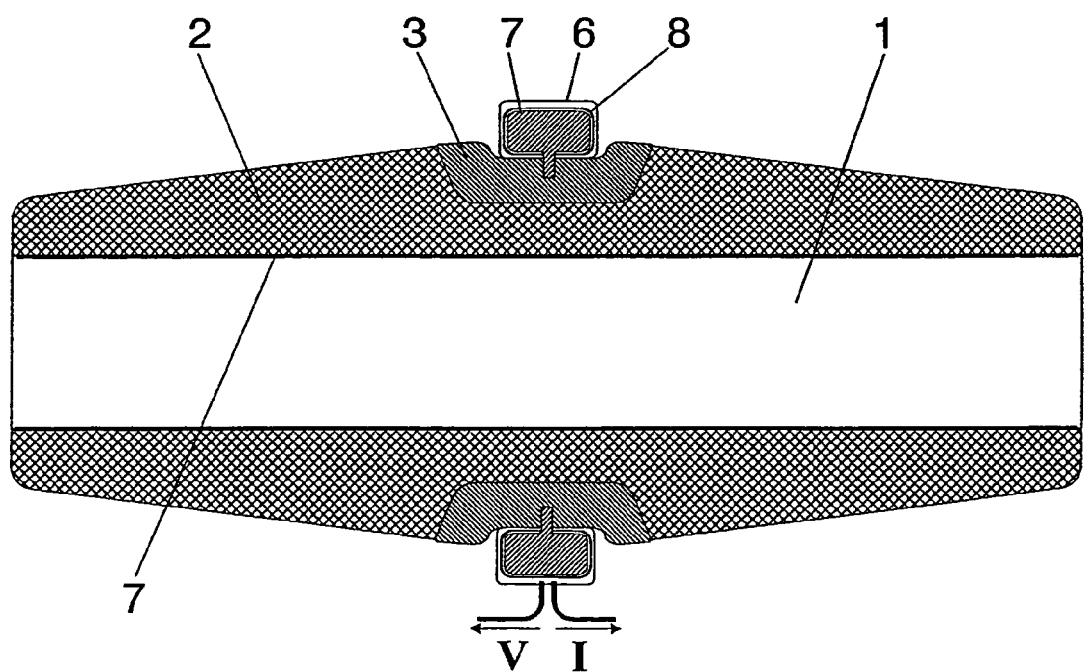
FIG.4
FIG.5

COUPLING SYSTEM BETWEEN HIGH-VOLTAGE ELECTRICAL EQUIPMENT

CROSS REFERENCE TO RELATED APPLICATION

The present application is a 35 U.S.C. §§ 371 national phase conversion of PCT/ES2004/000260filed 7 Jun. 2004, which claims priority from Spanish patent application P200301699 filed Jul. 18, 2003 incorporated herein by reference. The PCT International Application was published in the Spanish language.

OBJECT OF THE INVENTION

The present invention relates to a coupling system between high-voltage electrical equipment that incorporates means for protection against impacts and piercing, as well as against possible dielectric failures in the area exposed between the two high-voltage equipments. The system also incorporates means for obtaining voltage and current signals, as well as for obtaining the power required to feed electronic circuits associated to the equipment installed.

BACKGROUND OF THE INVENTION

Connection of modular high-voltage electrical equipment having a metallic envelope by insulated connections is a technique that is becoming widespread among the various manufacturers of electrical equipment.

These coupling systems can be classified into two groups:

Coupling systems in which the union of the equipment is achieved by a connector or connection assembly comprising an insulating piece or envelope, generally a body of revolution, inside which are the conducting elements. In this kind of systems the ends of the insulating piece penetrate the corresponding female connectors mounted on the equipment to be connected, electrically sealing the union. Examples of coupling systems of this kind are described for example in the following Patents: EP 0 520 933, WO 02/087042, WO 02/35668, EP 0 891 013 and DE 10119183.

Coupling systems in which the insulating element does not penetrate the pieces provided in the equipment to be joined electrically. Examples of these designs are described in European Patents 1 294 064 and 0 199 208. In these cases, in order to ensure the seal from an electrical standpoint, compression rings may be used as shown in European Patent 1 294 064.

In these coupling systems in order to control the distribution of the electric field in all cleanliness and humidity conditions, the surface of the connector or union assembly exposed between the two high-voltage equipment is referred to the ground potential, for which said external surface must be conducting or semi-conducting. For this purpose, it is common to use semi-conducting paint or semi-conducting materials injected on the insulating piece or envelope.

In order to provide the ground potential to said semi-conducting surface, helical springs may be used attached or connected on one end to the metallic envelope of the high-voltage electrical equipment, which is connected to earth, and on the other end are in contact with the semi-conducting layer of the connector or union assembly. The contact between the spring and the semi-conducting surface may be effected in two ways:

Tangential.

In this case the spring, disposed linearly, is attached by both ends to the metallic envelope of the high-voltage equipment. Contact with the semi-conducting surface is achieved by placing said surface between the two attachments of the spring, forcing the latter to deform into an arc instead of following a straight line between the attachments, thereby ensuring a permanent contact.

Circular.

In this case the spring, electrically connected to earth, forms a torus about the semi-conducting surface, such as shown in patent application DE 10119183.

This manner of providing the ground potential to the external semi-conducting layer of the connector or union assembly has the disadvantage that an excessive and prolonged vibration during transport of the equipment may wear the semi-conducting paint due to rubbing against the spring, producing surface areas without potential that could cause a dielectric failure resulting in an arc of a short but undefined length.

Another problem that may occur in these coupling systems between electrical equipment is penetration by pointed objects in the interstices between the equipment, damaging the exposed part of the connector or union assembly.

In addition, the need to monitor and automate electrical installations requires placing between the electrical equipment corresponding voltage and current sensors or gauges which, in the case of coupling between high-voltage cells, implies an additional difficulty as it requires making modifications in the high-voltage cells to allow making the required measurements.

Determining the presence of a voltage in the busbars of the main circuit of a set of high-voltage cells can be solved by using devices for insulated connections such as those disclosed in International application WO 02/35668, but the problem is that the high-voltage cells are not always installed with female connectors on the free side that allow using the device described in said patent application, and in any case it is not possible to measure the circuit current at the end of the set of cells.

DESCRIPTION OF THE INVENTION

The present invention relates to a coupling system with an insulated connection between high-voltage electrical equipment that allows solving all of the drawbacks discussed above, being of the type formed by a connector or union assembly that comprises an insulating shell, whose ends penetrate the corresponding female connector mounted on the equipment to be installed, inside which are housed some conducting elements, and which incorporates a conducting or semi-conducting layer on the external surface of the insulating envelope, allowing to effect a direct coupling of the various electrical equipment, such as the cell-cell union, the cell-distribution transformer union, etc.

The coupling system object of the invention has as its main characteristic the incorporation of a protection device disposed surrounding or enveloping the connector or union assembly.

From a constructive standpoint, the protection device may consist of a part mounted on the union assembly, preferably disposed surrounding the semiconductor layer, in the exposed area between the two electrical equipment to be joined or embedded in the shell of the union assembly.

This coupling system has the following advantages or functional characteristics compared to current systems:

It allows a greater protection of the coupling system against pointed objects by the constitution of the protection device, which provides a mechanical protection function in the more exposed areas of the coupling system.

A minimised arc length in case of dielectric failure of the coupling assembly, and thereby its destructive effect, by the constitution of the protection device of a conducting material that allows conducting the fault current to earth without generating an electrical arc.

Preventing the problems associated to the wear of the semi-conducting surface by the helical spring, due to prolonged vibrations during transportation. In this case, the said semi-conducting surface is connected to earth by the conducting protection device which, by embracing said semi-conducting surface, connects it to earth without any relative sliding between them nor any wear of the conducting/semi-conducting surface. The coupling system can also be connected to earth by a protection device, according to the object of the invention, which is not metallic but does have a semi-conducting or conducting surface connected to earth, which is in contact with the external semi-conducting surface of the union assembly.

The protection device of the coupling system object of the invention can incorporate sensors that allow obtaining values of several electric magnitudes, voltage and current.

Specifically, it can incorporate a current sensor, with or without a magnetic core, that allows obtaining the current flowing in the main busbars in order to provide its value or for protection, measurement and control functions. In addition, the power obtained in the current sensor as the current flows in the main circuit can be used to power the circuits of ancillary equipment such as relays, alarms, communications equipment, etc.

The voltage signal is obtained by not referencing to earth the external semi-conducting/conducting surface of the union assembly. In this case, said surface acquires a potential as a function of the capacity between the inner surface of the insulating protection device, at the high-voltage potential, and the external semi-conducting/conducting surface. This voltage signal can be used, for example, to:

Indicate the presence or absence of voltage at the busbars of the main circuit.
Obtain a measurement of the voltage at the main circuit busbars.
Obtain power to feed ancillary circuits.
Polarize directional protections with the voltage vector.
Perform protection, measurement and control functions related to the voltage magnitude.

DESCRIPTION OF THE DRAWINGS

FIG. 4 shows an embodiment of the coupling assembly in which the protection device incorporates a current sensor composed of a core (7) on which is wound a conductor (8) and a voltage sensor that provides the voltage of the semi-conducting layer (3).

FIG. 5 shows a coupling system, with a voltage sensor, based on the embodiment shown in FIG. 3.

PREFERRED EMBODIMENT OF THE INVENTION

For purposes of illustration only and in a non-limiting sense, an embodiment of the aforementioned high-voltage coupling system object of the invention is presented below.

Figure 1:
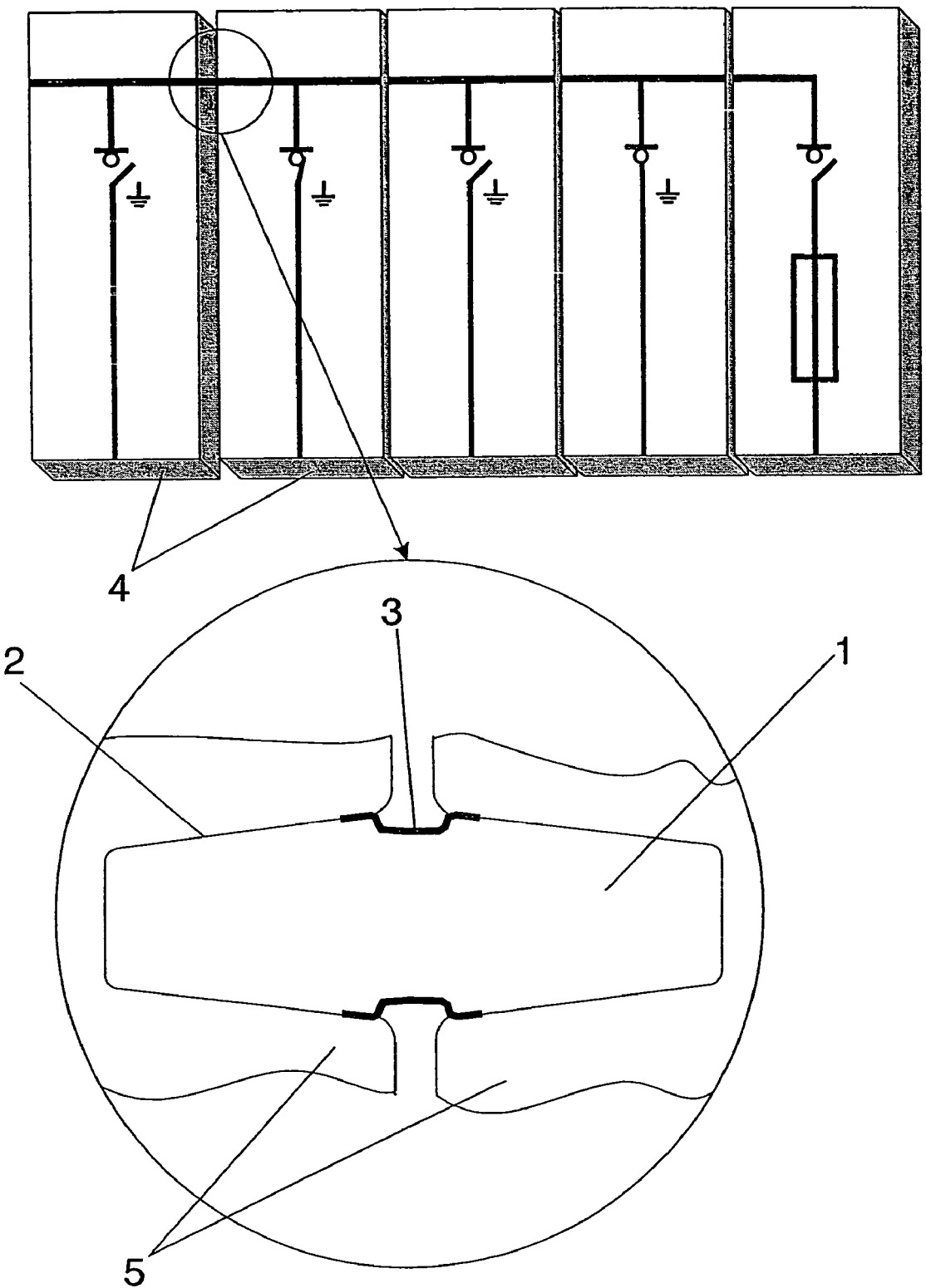
FIG. 1 shows a coupling system (1) for high-voltage equipment (4) consisting of a union assembly composed of an insulating shell (2) that connects two high-voltage cells (5) and has a semi-conducting layer (3) on its external surface.

FIG. 1 shows the coupling system used to configure an electrical layout with a set of high-voltage cells (4) which, however, may be equally used to join a cell (4) with a distribution transformer.

FIG. 1 also shows how the coupling system is composed of a connector or union assembly (1) comprising an insulating shell (2) that inserts in female connectors (5) of the high-voltage equipment (4), incorporating a semi-conducting layer or surface (3) that is referenced to earth and disposed in the space between the equipment (4) to be joined.

Figure 2:
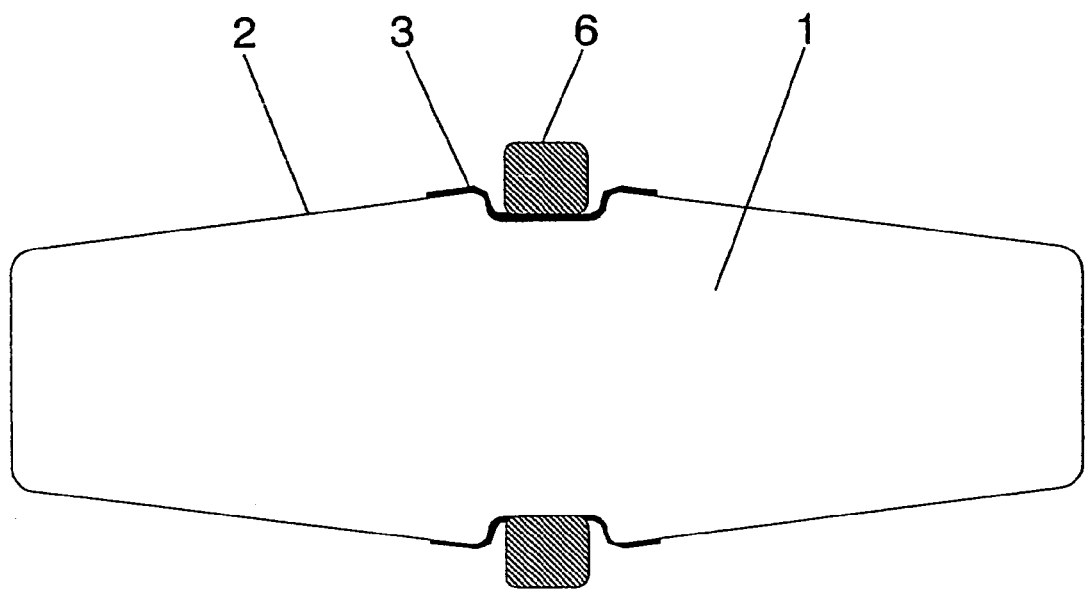
FIG. 2 shows a coupling system, according to the object of the invention, incorporating a protection device (6) that surrounds the connector or union assembly (1), in the area in which the semi-conducting layer (3) is disposed.

FIG. 2 shows a connector or union assembly (1), according to the object of the invention, incorporating a protection device (6) disposed surrounding the connector (1), in the exposed area between the electrical equipment to be joined, coinciding with the semi-conducting layer (3). The protection device (6) is made of a metallic material to provide a greater mechanical protection of the union assembly (1).

Said protection device (6) is configured as a conducting ring, connected to earth, that provides the earth potential to the semi-conducting/conducting surface (3) and leads the fault current to earth without generating an arc in the separation between the high-voltage electrical equipment. The application of the earth reference to the protection device (6) is achieved by a spring that contacts said device tangentially, not shown.

Alternatively, the protection device (6) can be made of a non-metallic material such as plastic or elastomer, doped or superficially treated to be conducting/semi-conducting, that can provide the conductor (1) with mechanical protection while referencing to earth the semi-conducting layer (3).

Figure 3:
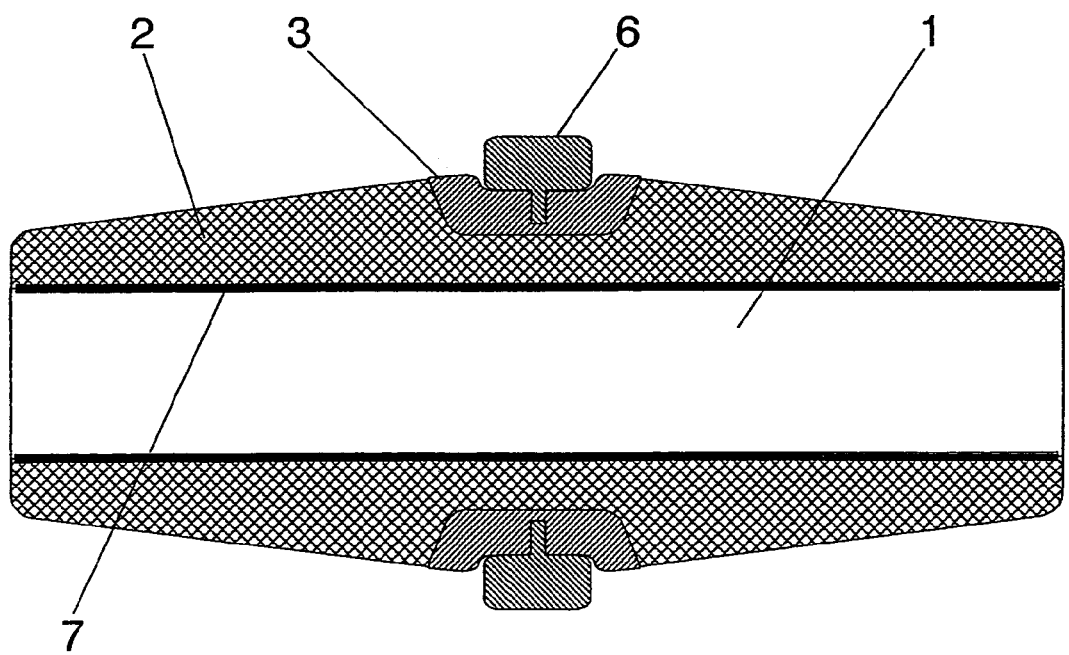
FIG. 3 shows another embodiment of the coupling system, in which the protection device (6) is partially enclosed in a semiconductor material (3), which is in turn embedded in the shell of insulating material (2) of the union assembly (1). The figure does not show the elements performing the electrical connection.

FIG. 3 represents another embodiment of the union assembly (1) in which the protection device (6) is partially housed in a semiconductor (3) embedded in the insulating envelope (2) providing a function identical to that described above.

FIG. 4 shows a detail of the union assembly (1) which includes a current sensor placed inside the protection device (6). This gauge consists of a core (7) around which is wound the conductor (8), allowing to detect the current flowing inside the coupling assembly (1). The core (7) may or may not be magnetic, a Rogowski coil, according to the sensitivity required of the sensor.

FIG. 5 shows a union assembly (1), incorporating a current sensor consisting of a magnetic core (7) and a conducting coil (8), in which the protection device (6) presents a configuration as shown in FIG. 3.

A voltage sensor can also be included, in which case the semi-conducting/conducting surface (3) will not be referenced to earth, instead being left at a floating potential in order to capture, by contacting the aforementioned surface of the protection device (6), the voltage of said surface (3). As an option, the external area not in contact with the surface (3) may be referenced to the ground potential.

Figure 6:
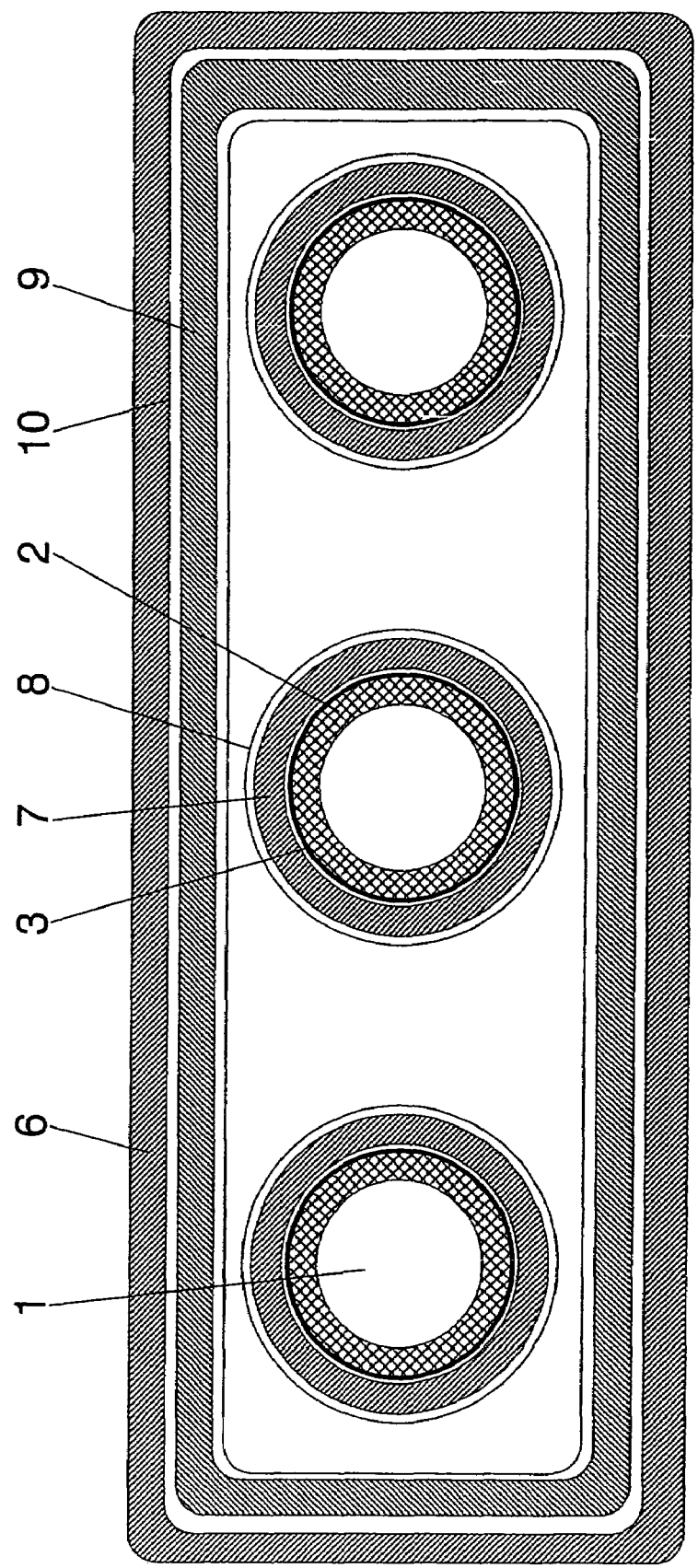
FIG. 6 shows a coupling system, according to the embodiment shown in FIG. 4, incorporating a unipolar current sensor (9) that envelopes the three phases.

According to FIG. 6, the protection device (6) can encompass all connectors (1) of the coupling system phases, and may also incorporate a current sensor for detecting faults to earth whose core (9), wound by the coil (10), envelopes all phases of the system.

The invention claimed is:

1. A coupling system between high-voltage electrical equipment including a connector that inserts in female connectors of the high voltage equipment the connector comprising:
- an insulating shell inside which are housed conducting elements, whose external surface is partially covered by a conductive layer and
- a mechanical protection device, being an independent part to the rest of the elements of the coupling system and disposed surrounding the conductive layer and in contact with said conductive layer.

2. The coupling system between high-voltage electrical equipment according to claim 1, wherein that the protection device consists of a conducting ring connected to earth.

3. The coupling system between high-voltage electrical equipment according to claim 2, wherein that the conducting ring connected to earth is metallic.

4. Amended) The coupling system between high-voltage electrical equipment according to claim 1, wherein the protection device includes an inductive current sensor.

5. The coupling system between high-voltage electrical equipment according to claim 4, wherein that the current sensor consists of a Rogowski coil.

6. The coupling system between high-voltage electrical equipment according to claim 4, wherein that the current sensor consists of a winding about a magnetic core.

7. The coupling system between high-voltage electrical equipment according to the claim 1, wherein in the protection device includes a capacitive voltage sensor.

8. The coupling system between high-voltage electrical equipment according to claim 1,
wherein the protection device encompasses all the connectors of the phases of the coupling system between high-voltage equipment.

9. The coupling system between high-voltage electrical equipment according to claim 8, wherein the protection device consists of a conducting ring connected to earth.

10. The coupling system between high-voltage electrical equipment according to claim 9, wherein that the conducting ring connected to earth is metallic.

11. The coupling system between high-voltage electrical equipment according to claim 8, further comprising a current sensor that externally encompasses all phases of the coupling system between high voltage equipment.

12. The coupling system between high-voltage electrical equipment according to claim 11, further comprising a current sensor for each phase.

13. The coupling system between high-voltage electrical equipment according to claims 8, wherein the protection device incorporates voltage detection for each phase of a main circuit.

* * * * *